US009929419B2

(12) United States Patent
Cho

(10) Patent No.: US 9,929,419 B2
(45) Date of Patent: Mar. 27, 2018

(54) DEVICE AND METHOD FOR MONITORING DRYNESS OF FUEL CELL STACK

(71) Applicant: Hyundai Motor Company, Seoul (KR)

(72) Inventor: Sung Mun Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 245 days.

(21) Appl. No.: 14/865,205

(22) Filed: Sep. 25, 2015

(65) Prior Publication Data

US 2016/0164126 A1  Jun. 9, 2016

(30) Foreign Application Priority Data

Dec. 3, 2014 (KR) .................... 10-2014-0171903

(51) Int. Cl.
| | | |
|---|---|---|
| *G01N 27/416* | (2006.01) | |
| *H01M 8/04492* | (2016.01) | |
| *H01M 8/04992* | (2016.01) | |
| *H01M 8/04537* | (2016.01) | |
| *H01M 8/04828* | (2016.01) | |
| *H01M 8/1018* | (2016.01) | |

(52) U.S. Cl.
CPC ... *H01M 8/04492* (2013.01); *H01M 8/04559* (2013.01); *H01M 8/04589* (2013.01); *H01M 8/04828* (2013.01); *H01M 8/04992* (2013.01); *H01M 2008/1095* (2013.01); *H01M 2250/20* (2013.01); *Y02T 90/32* (2013.01)

(58) Field of Classification Search
CPC ............................................. H01M 8/04492
USPC ........................................................ 324/426
See application file for complete search history.

(56) References Cited

U.S. PATENT DOCUMENTS

| | | | | |
|---|---|---|---|---|
| 9,105,889 | B2* | 8/2015 | Suematsu | ........ H01M 8/04126 |
| 2009/0191437 | A1* | 7/2009 | Maeshima | ........ H01M 8/04029 |
| | | | | 429/434 |
| 2011/0076584 | A1 | 3/2011 | Katano | |
| 2015/0056527 | A1 | 2/2015 | Kim et al. | |
| 2016/0079620 | A1 | 3/2016 | Son | |

FOREIGN PATENT DOCUMENTS

| | | | |
|---|---|---|---|
| JP | 2002-164065 A | 6/2002 | |
| JP | 2007012429 A * | 1/2007 | ............. H01M 8/04 |
| JP | 2008-041625 A | 2/2008 | |
| JP | 4378735 B1 | 12/2009 | |
| JP | 2010-123430 A | 6/2010 | |
| KR | 2007-012429 A | 1/2007 | |

(Continued)

*Primary Examiner* — Edward Tso
*Assistant Examiner* — Ahmed Omar
(74) *Attorney, Agent, or Firm* — Mintz Levin Cohn Ferris Glovsky and Popeo, P.C.; Peter F. Corless

(57) ABSTRACT

A device and a method for monitoring dryness of a fuel cell stack can accurately determine whether the fuel cell stack is dry or not, to ensure smooth operation and performance of the fuel cell stack during operation of a fuel cell vehicle. The device includes a voltage sensing unit that monitors voltage of the fuel cell stack in real time; a current sensing unit that monitors current of the fuel cell stack in real time; a counting unit that compares the monitored voltage with a standard current-voltage performance curve; and a stack dryness determining unit that determines that the fuel cell stack is dry when a count determined by the counting unit is a standard level or more.

6 Claims, 4 Drawing Sheets

(56) References Cited

FOREIGN PATENT DOCUMENTS

| | | |
|---|---|---|
| KR | 10-2011-0036448 | 4/2011 |
| KR | 10-1418179 | 6/2014 |
| KR | 10-1428299 | 6/2014 |
| KR | 10-1481310 B1 | 1/2015 |
| KR | 10-2015-0026265 A | 3/2015 |
| KR | 10-1567238 B1 | 11/2015 |

* cited by examiner

DEVICE AND METHOD FOR MONITORING DRYNESS OF FUEL CELL STACK

CROSS-REFERENCE TO RELATED APPLICATION

This application claims under 35 U.S.C. § 119(a) the benefit of Korean Patent Application No. 10-2014-0171903 filed on Dec. 3, 2014, the entire contents of which are incorporated herein by reference.

BACKGROUND (a) Technical Field

The present invention relates to a device and a method for monitoring dryness of a fuel cell stack, more particularly, to the device and the method for monitoring dryness, which make it possible to accurately determine whether the fuel cell stack is dry or not.

(b) Description of the Related Art

A fuel cell, which is a type of power generation device for generating electricity that is the energy source of fuel cell vehicles, has a structure in which an anode to which hydrogen is supplied and a cathode to which air is supplied are stacked with an electrolyte assembly therebetween, and generates electricity using a chemical reaction between the oxygen in the air and the hydrogen supplied from the outside.

A fuel cell is manufactured in a fuel cell stack with tens to hundreds of unit cells stacked, and the configuration of one unit cell is described hereafter with reference to FIG. 5 (RELATED ART).

First, a membrane-electrode assembly (MEA) is disposed at the innermost part of the fuel cell stack, and is composed of a polymer electrolyte membrane 10 allowing hydrogen protons to move and catalytic layers applied to both sides of the electrolyte membrane to allow a reaction of hydrogen and oxygen, that is, a cathode 12 and an anode 14.

Further, gas diffusion layers (GDLs) 16 are disposed at the outer part of the fuel cell stack where the cathode 12 and the anode 14 are positioned, separators 20 having a flow field to supply fuel and discharge water produced by a reaction are disposed outside the GDLs 16, with gaskets 18 therebetween, and end plates 30 for supporting and fixing these components are disposed at the outermost sides.

Accordingly, an oxidation reaction of hydrogen occurs and thereby protons and electrons are produced at the anode 14 of the fuel cell stack, the protons and electrons move to the cathode 12 through the electrolyte membrane 10 and the separator 20, respectively, and at the cathode 12, water is produced by an electrochemical reaction of the protons and electrons which have moved from the anode 14 and the oxygen in the air and simultaneously electric energy is generated by flow of the electrons.

The fuel cell stack needs to be as humid as possible, because the protons can move well to the cathode from the anode through the electrolyte membrane when the fuel cell stack is in a humid state.

When the fuel cell stack is dry, the electrolyte membrane is dry and protons cannot move well accordingly, so problems such as generally decreasing the performance of the fuel cell including drop in voltage generated by the stack and the like.

When the electrolyte membrane is repeatedly dried and humidified, durability of the electrolyte membrane decreases.

In the meantime, the amount of air to the amount of water produced in the stack in the operation of the fuel cell stack is basically large, because the end cells of a plurality of cells in the stack or a common distributor connected to the end cells cause flooding that is a phenomenon in which the cells are filled with the produced water if an amount of air is small.

Accordingly, when current load is generated under the condition of a flooding phenomenon, it negatively influences the durability of the cells, so in order to prevent this influence, a larger amount of air than the produced water is supplied into the stack to keep a larger amount of air than the produced water in the stack.

As a larger amount of air than the produced water resulting from a reaction in the stack is supplied, the entire stack is necessarily kept dry, and as described above, when the stack is dry, protons cannot move well, so that performance of the stack is deteriorated and the durability of the electrolyte membrane decreases.

The above information disclosed in this Background section is only for enhancement of understanding of the background of the invention and therefore it may contain information that does not form the prior art that is already known in this country to a person of ordinary skill in the art.

SUMMARY

The present invention provides a device and a method for monitoring dryness of a fuel cell stack so as to maintain smooth operation and performance of the fuel cell stack by accurately determining whether the fuel cell stack is dry or not, and inducing a measure while a fuel cell vehicle is in operation.

In one aspect, the present invention provides a device for monitoring dryness of a fuel cell stack, and includes: a voltage sensing unit that monitors voltage of a fuel cell stack in real time; a current sensing unit that monitors current of the fuel cell stack in real time; a counting unit that counts to determine whether the monitored voltage for the same current is low or high by comparing the monitored voltage of the stack with a standard current-voltage performance curve; and a stack dryness determining unit that determines that the fuel cell stack is dry when a count determined by the counting unit is a standard level or more.

In a preferred embodiment, the counting unit increases or decreases the count by one when the monitored voltage is lower or higher, respectively, than a voltage on the standard current-voltage performance curve, on the basis of a point where the monitored current and a current on the standard current-voltage performance curve are the same.

In another preferred embodiment, the device further comprises a stack restoration control unit that performs restoration control for humidifying the stack when the fuel cell stack is determined as being dry.

In another aspect, the present invention provides a method of monitoring dryness of a fuel cell stack, including steps of: monitoring voltage of a fuel cell stack in real time; monitoring current of the fuel cell stack in real time; counting to determine whether the monitored voltage for the same current is low or high by comparing the monitored voltage of the stack with a standard current-voltage performance curve; and determining that the fuel cell stack is dry when a count determined by the counting unit is a standard level or more.

In a preferred embodiment, on the basis of a point where the monitored current and a current on the standard current-voltage performance curve are the same, when the monitored voltage is lower than a voltage on the standard current-voltage performance curve, the count is increased by one, and when the monitored voltage is higher than a voltage on the standard current-voltage performance curve, the count is decreased by one.

In another preferred embodiment, the method further comprises performing restoration control for humidifying the stack, when the fuel cell stack is determined as being dry.

In still another preferred embodiment, the restoration control for humidifying the stack is achieved by one or more selected from increasing desired relative humidify of stack air, decreasing basic air flow for a stack, forcibly cooling a stack, and avoiding low output of a stack.

A non-transitory computer readable medium containing program instructions executed by a processor preferably includes: program instructions that monitor voltage of a fuel cell stack in real time; program instructions that monitor current of the fuel cell stack in real time; program instructions that count to determine whether the monitored voltage for the same current is low or high by comparing the monitored voltage of the stack with a standard current-voltage performance curve; and program instructions that determine that the fuel cell stack is dry when a count determined by the counting unit is a standard level or more.

The present invention provides the following effects from the embodiments.

First, it is possible to accurately determine whether a stack is dry by monitoring a voltage with the present stack current in real time while a fuel cell vehicle is driven, and by comparing the voltage with a standard current-voltage performance curve when the stack become dry.

Second, when the stack is determined as being dry, restoration control is performed to humidify the stack, so the stack performance can be maintained.

Third, it is possible to not only maintain stack performance but also improve stack durability by determining whether the stack is dry and induce restoration control for humidifying a stack.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
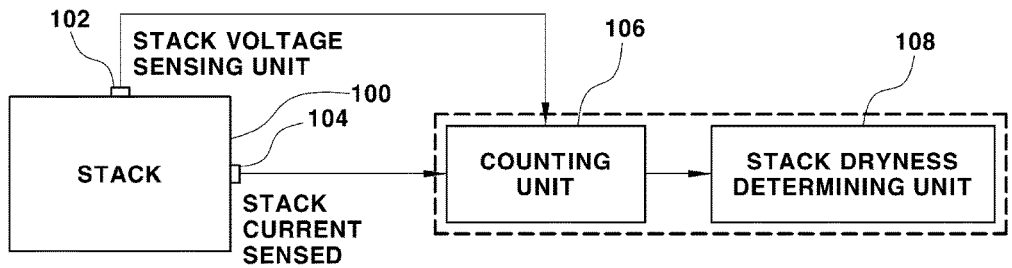
FIG. 1 is a diagram illustrating the configuration of a device for monitoring dryness of a fuel cell stack according to the present invention.
Figure 2:
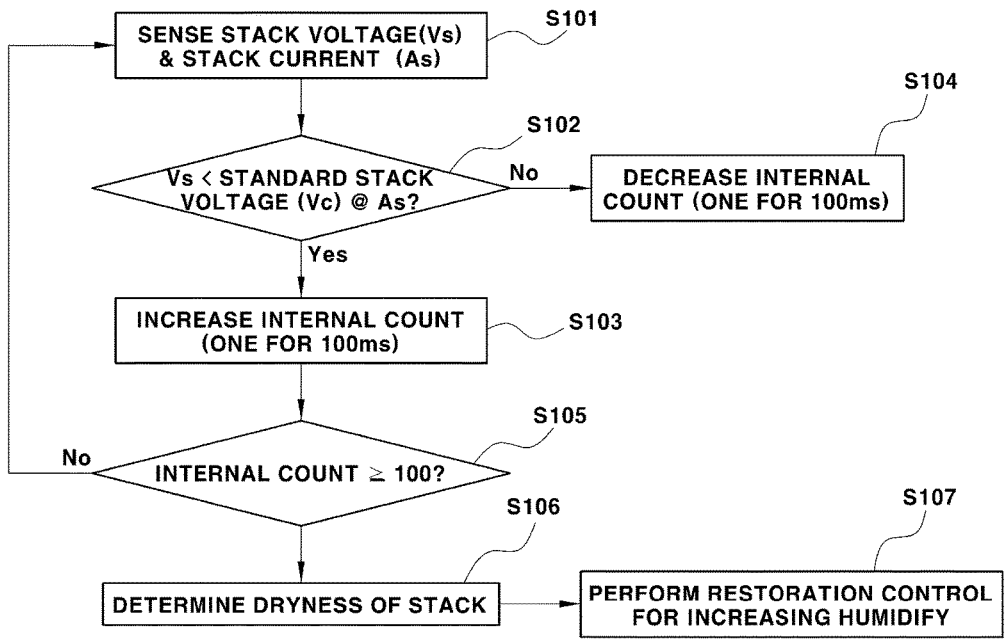
FIG. 2 is a flow chart illustrating a method of monitoring dryness of a fuel cell stack according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, embodiments of the present invention are described in detail with reference to the accompanying drawings.

The present invention is configured to monitor the present current and voltage generated by a stack in real time while a fuel cell vehicle is in operation, and accurately determine whether the stack is dry or not by comparing the monitored current and voltage with a standard current-voltage performance curve when a stack is dry.

FIG. 1 in the accompanying drawings is a diagram illustrating the configuration of a device for monitoring dryness of a fuel cell stack according to the present invention.

As shown in FIG. 1, a device for monitoring dryness of a stack of the present invention comprises a voltage sensing unit 102 that monitors voltage generated by operation of a fuel cell stack 100 in real time, a current sensing unit 104 that monitors current generated in the fuel cell stack 100 in real time, a counting unit 106 that counts to determine whether monitored voltage for the same current is low or high by comparing the monitored voltage of the stack with a standard current-voltage performance curve, and a stack dryness determining unit 108 that determines that the fuel cell stack 100 is dry when a count determined by the counting unit 106 is a standard level or more.

The counting unit 106 and the stack dryness determining unit 108 may be arranged in one controller. The counting unit 106 compares the current monitored by the current sensing unit 104 with a current on the standard current-voltage performance curve and takes the point where the both currents are the same as a reference, and then when the voltage monitored by the voltage sensing unit 102 is lower than the voltage on the standard current-voltage performance curve, the counting unit 106 outputs a signal for increasing a count (i.e., a count number or value) by one to the stack dryness determining unit 108, whereas when the voltage monitored by the voltage sensing unit 102 is larger than the current on the standard current-voltage performance curve, the counting unit 106 outputs a signal for decreasing the count by one to the stack dryness determining unit 108.

The stack dryness determining unit 108 receives a count signal from the counting unit 106, and when the count increases to a standard value or more (for example, 100 or more, or any suitable number depending on the standard being used), the stack dryness determining unit 108 determines that the fuel cell stack is dry.

The device for monitoring dryness of a fuel cell stack of the present invention further includes a stack restoration control unit that performs restoration control for humidifying the stack when the stack dryness determining unit 108 determines that the fuel cell stack is dry.

A method of monitoring dryness of a fuel cell stack of the present invention based on the configuration described above is described hereafter.

First, while a fuel cell vehicle equipped with a fuel cell stack is driven, the voltage sensing unit 102 monitors, in real time, voltage generated by operation of the fuel cell stack 100 and simultaneously the current sensing unit 104 monitors, in real time, current generated in the fuel cell stack 100, and corresponding signals are outputted to the counting unit 106 (S101).

Next, the current and the voltage of the stack monitored by the counting unit 106 are compared with the standard current-voltage performance curve (S102), and it is determined whether the monitored voltage is higher or lower for the same current, as the result of the comparing, such that a count is maintained.

For example, with respect to the point where the monitored current and a current on the standard current current-voltage performance curve are the same, when the monitored voltage is lower than the voltage on the standard current current-voltage performance curve, the counting unit 106 increases the count by one (S103), and when the monitored voltage is higher than the voltage on the standard current current-voltage performance curve, the counting unit 106 decreases the count by one (S104), wherein the counting unit 106 outputs those count signals to the stack dryness determining unit 108.

Figure 3:
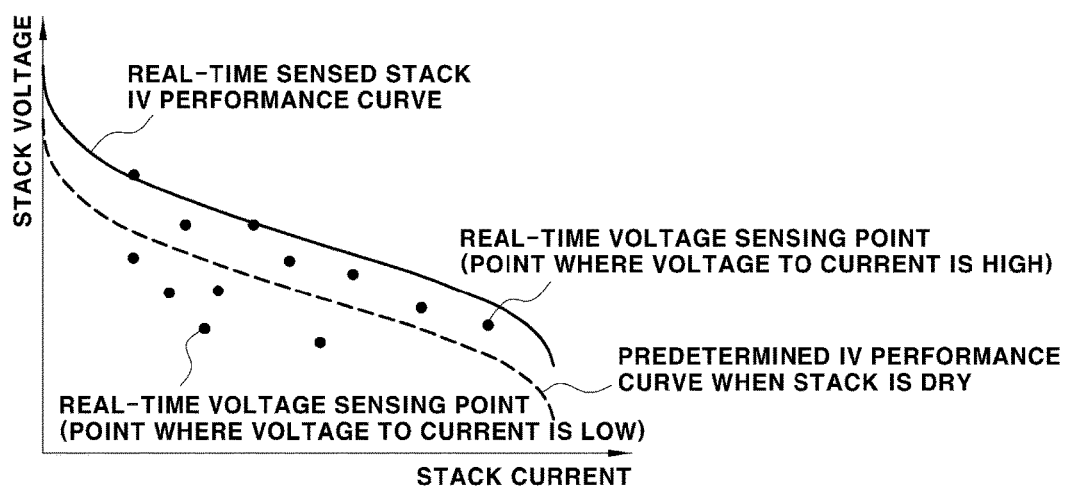
FIG. 3 is a graph showing a process of comparing stack current and voltage with a standard current-voltage performance curve in order to monitor dryness of a fuel cell stack according to the present invention.

In detail, as shown in FIG. 3, in a case when the monitored voltages for the same current are higher or lower than a predetermined current-voltage performance curve with a stack dry, when the voltage is higher than the curve, the count is increased by one, and when voltage is lower than the curve, the count is decreased by one, wherein those count signals are outputted to the stack dryness determining unit 108.

The stack dryness determining unit 108 receives the count signals from the counting unit 106, and when the count increases to a standard value or more (for example, 100 or more), it determines that the fuel cell stack is dry.

The reason of determining that the stack is dry only when the count is the standard value or more is because the stack voltage drops due to various reasons, even if the stack is not dry in operation. Accordingly, it is determined that the stack is dry only when a number of cases with the monitored voltage lower than the voltage on the standard current current-voltage performance curve is the standard value or more (for example, 100 or more, or any suitable number depending on the standard being used).

When the fuel cell stack is determined as being dry, the restoration control for humidifying the stack is performed.

Preferably, the restoration control for humidifying the stack may be achieved by one or more selected from the group consisting of: increasing desired relative humidify of stack air, decreasing basic air flow for a stack, forcibly cooling a stack, and avoiding low output of a stack.

The increasing desired relative humidify of stack air is a method for preventing a stack from drying by increasing desired relative humidity of air supplied to a cathode, and the decreasing basic air flow for a stack is a method of increasing the ratio of the produced water to the amount of air in a stack by temporarily decreasing air supplied to a cathode.

The forcible cooling of a stack is a method for preventing evaporation by cooling the produced water in a stack to prevent the stack from drying due to evaporation of the produced water in the stack, and the avoiding low output of a stack is a method of increasing the produced water by artificially increasing the output of the stack because the amount of air to the produced water is large at low output.

The effect of the restoration control for increasing humidity has been proved, but it is important to determine when the restoration control is performed and when the restoration control is stopped.

Figure 4:
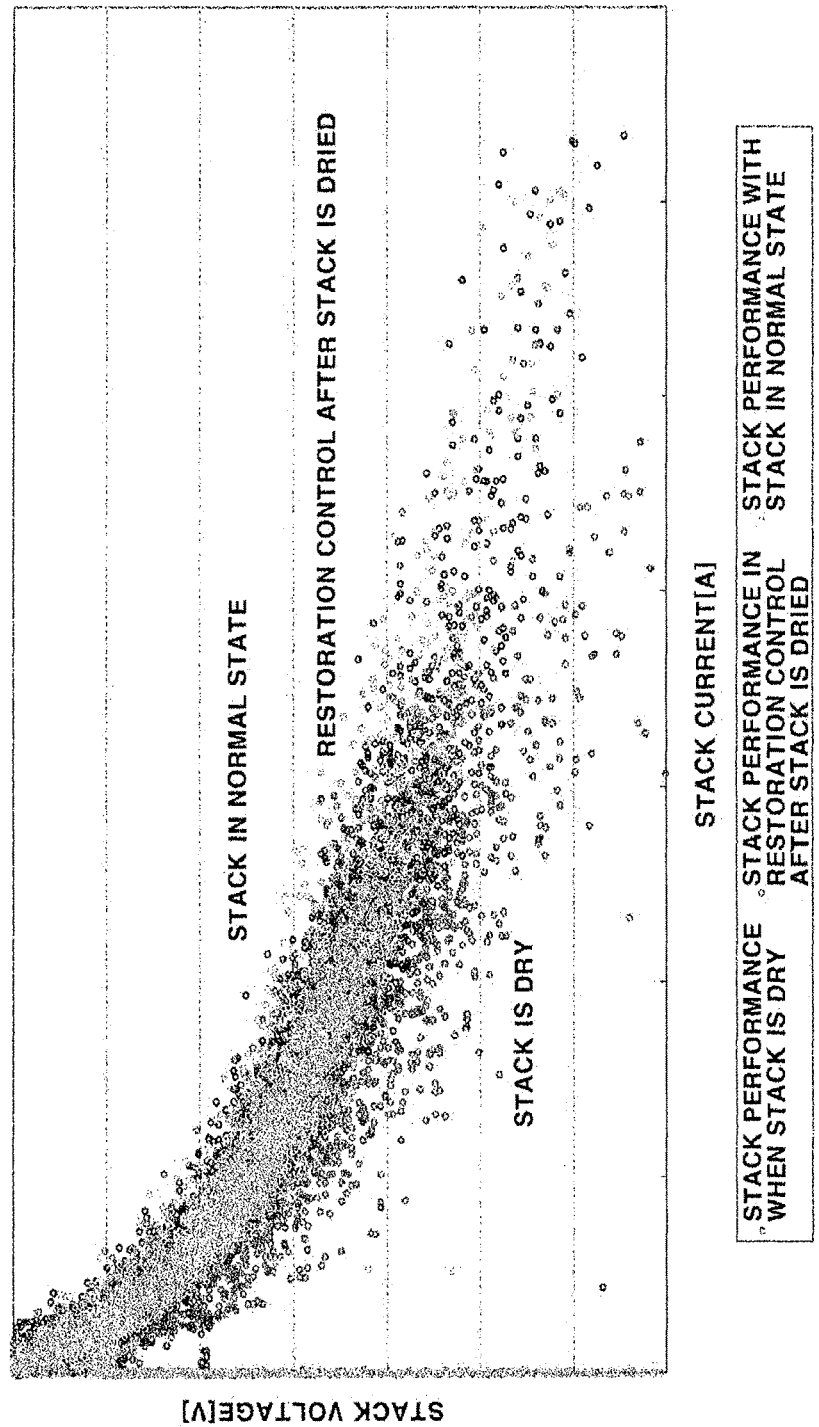
FIG. 4 is a graph showing stack performance when a stack is in a normal state, is dry, and is controlled to be recovered from a dry state.
Figure 5:
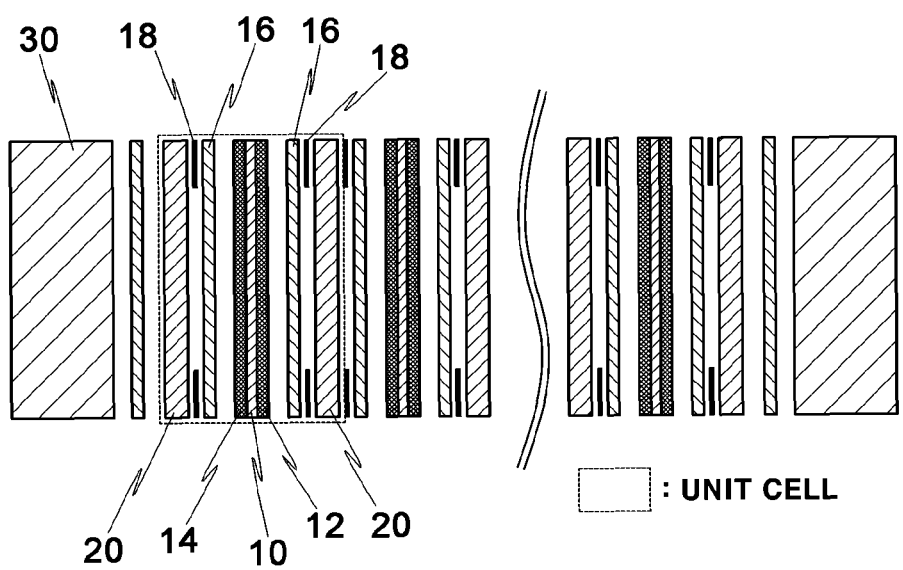
FIG. 5 (RELATED ART) is a schematic view illustrating the configuration of cells in a fuel cell.

In particular, as shown in FIG. 4, when the restoration control is started before a stack that has normally operated actually becomes dry, the restoration control (for example, forcible cooling of a stack) rather causes dropping of the cell voltage and decreasing of the stack performance.

Further, while the restore control is performed with a stack dry, if the restore control is not stopped even though the stack performance has been restored, the cell voltage is dropped and the stack performance is decreased; therefore, it is preferable to perform the restoration control for humidifying at a level where the stack performance is not decreased.

As described above, it is possible to accurately determined whether a stack is dry by monitoring a voltage with the present stack current in real time while a fuel cell vehicle is driven, and by comparing the voltage with a standard current-voltage performance curve when the stack become dry. Further, when the stack is determined as being dry, a restoration control is performed to humidify the stack, so the stack performance can be maintained.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A device for monitoring dryness of a fuel cell stack, comprising:
    a voltage sensing unit that monitors voltage of the fuel cell stack in real time;
    a current sensing unit that monitors current of the fuel cell stack in real time;
    a counting unit that counts to determine whether the monitored voltage for the same current is low or high by comparing the monitored voltage of the stack with a standard current-voltage performance curve; and
    a stack dryness determining unit that determines that the fuel cell stack is dry when a count determined by the counting unit is a standard level or more,
    wherein the counting unit increases or decreases the count by one, when the monitored voltage is lower or higher, respectively, than a voltage on the standard current-voltage performance curve, on the basis of a point where the monitored current and a current on the standard current-voltage performance curve are the same.

2. The device of claim 1, further comprising a stack restoration control unit that performs restoration control for humidifying the stack when the fuel cell stack is determined as being dry.

3. A method of monitoring dryness of a fuel cell stack, comprising:
    monitoring voltage of the fuel cell stack in real time;
    monitoring current of the fuel cell stack in real time;
    counting to determine whether the monitored voltage for the same current is low or high by comparing the monitored voltage of the stack with a standard current-voltage performance curve; and
    determining that the fuel cell stack is dry when a count determined by the counting unit is a standard level or more,
    wherein on the basis of a point where the monitored current and a current on the standard current-voltage performance curve are the same, when the monitored voltage is lower than a voltage on the standard current-voltage performance curve, the count is increased by one, and when the monitored voltage is higher than a voltage on the standard current-voltage performance curve, the count is decreased by one.

4. The method of claim 3, further comprising performing restoration control for humidifying the stack when the fuel cell stack is determined as being dry.

5. The method of claim 4, wherein the restoration control for humidifying the stack is achieved by one or more selected from increasing desired relative humidify of stack air, decreasing basic air flow for a stack, forcibly cooling a stack, and avoiding low output of a stack.

6. A non-transitory computer readable medium containing program instructions executed by a processor, the computer readable medium comprising:
    program instructions that monitor voltage of a fuel cell stack in real time;
    program instructions that monitor current of the fuel cell stack in real time;
    program instructions that count to determine whether the monitored voltage for the same current is low or high by comparing the monitored voltage of the stack with a standard current-voltage performance curve; and
    program instructions that determine that the fuel cell stack is dry when a count determined by the counting unit is a standard level or more,
    wherein on the basis of a point where the monitored current and a current on the standard current-voltage performance curve are the same, when the monitored voltage is lower than a voltage on the standard current-voltage performance curve, the count is increased by one, and when the monitored voltage is higher than a voltage on the standard current-voltage performance curve, the count is decreased by one.

* * * * *